UNITED STATES PATENT OFFICE.

SAMUEL OTIS JOHNSON, OF KEY WEST, FLORIDA.

WATER-PURIFYING COMPOUND.

966,559.　　　　Specification of Letters Patent.　　Patented Aug. 9, 1910.

No Drawing.　　Application filed July 26, 1909.　Serial No. 509,626.

*To all whom it may concern:*

Be it known that I, SAMUEL O. JOHNSON, a citizen of the United States, residing in Key West, in the county of Monroe and State of Florida, have invented a new and useful Improvement in Water - Purifying Compounds, of which the following is a specification.

This invention relates to a compound for purifying water and for destroying all germs and other forms of insect life which may be contained therein, thereby not only purifying water in wells and cisterns, but also preventing standing water in either receptacles or pools from becoming breeding places for mosquitos, and other water breeding insects.

By experimentation, I have found that a small amount of my composition, which is put up in the form of small balls will keep free of germs a large amount of water, four of said balls keeping pure and free from germ life over one thousand gallons of water for a period of six months.

In preparing the compound I take one part of pulverized charcoal, place the same in a vat or other receptacle and then add and thoroughly mix with said charcoal two parts of flower of sulfur, then mix in one part of crude petroleum, and finally add one part of coal tar, mixing all of the above mentioned ingredients together. The mixture is then permitted to stand two or three days during which time it hardens sufficiently for it to be made up into balls having the diameter of about one and one-half inches, and the balls are then placed in a cool place where they are kept until they become hard and dry. They are then in condition to be packed for sale or to be placed in use. These ingredients are put up in the form of balls, or cakes and may be of any desired size. In use, one or more of these balls are placed in the standing water to be purified.

What I claim is:

1. A water purifying compound consisting of a cake formed of coal tar, petroleum, sulfur, and pulverized charcoal, all thoroughly mixed substantially in the proportions specified.

2. A water purifying compound consisting of a hardened and dried cake formed of one part of pulverized charcoal, two parts of flower of sulfur, one part of petroleum and one part of coal tar, the said ingredients being thoroughly mixed and distributed uniformly throughout the cake.

SAMUEL OTIS JOHNSON.

Witnesses:
　E. M. MARTIN,
　JAMES L. JOHNSON.